United States Patent
Yamawaki et al.

(10) Patent No.: US 10,355,251 B2
(45) Date of Patent: Jul. 16, 2019

(54) SECONDARY BATTERY

(71) Applicant: SANYO Electric Co., Ltd., Daito-shi, Osaka (JP)

(72) Inventors: Takuya Yamawaki, Hyogo (JP); Eiji Okutani, Hyogo (JP)

(73) Assignee: SANYO Electric Co., Ltd., Daito-shi, Osaka (JP)

( * ) Notice: Subject to any disclaimer, the term of this patent is extended or adjusted under 35 U.S.C. 154(b) by 242 days.

(21) Appl. No.: 15/196,580

(22) Filed: Jun. 29, 2016

(65) Prior Publication Data

US 2017/0005301 A1  Jan. 5, 2017

(30) Foreign Application Priority Data

Jun. 30, 2015  (JP) .................. 2015-130520

(51) Int. Cl.
| | | |
|---|---|---|
| *H01M 10/0587* | (2010.01) | |
| *H01M 2/02* | (2006.01) | |
| *H01M 2/06* | (2006.01) | |
| *H01M 10/0525* | (2010.01) | |

(52) U.S. Cl.
CPC ......... *H01M 2/028* (2013.01); *H01M 2/0275* (2013.01); *H01M 2/06* (2013.01); *H01M 10/0525* (2013.01); *H01M 10/0587* (2013.01)

(58) Field of Classification Search
CPC ..... H01M 2/0277; H01M 2/028; H01M 2/029
See application file for complete search history.

(56) References Cited

U.S. PATENT DOCUMENTS

| | | | | |
|---|---|---|---|---|
| 2005/0233214 A1* | 10/2005 | Marple | ............... | H01M 2/1653 429/221 |
| 2007/0196729 A1 | 8/2007 | Yamauchi et al. | | |
| 2010/0209750 A1* | 8/2010 | Nagamatsu | ......... | H01M 2/0262 429/94 |
| 2011/0206962 A1* | 8/2011 | Minami | ............. | H01M 2/1653 429/94 |
| 2014/0308555 A1* | 10/2014 | Hattori | ............. | H01M 10/0431 429/94 |

FOREIGN PATENT DOCUMENTS

| | | |
|---|---|---|
| JP | 8-64199 A | 3/1996 |
| JP | 8-115729 A | 5/1996 |
| JP | 2009-48966 A | 3/2009 |
| JP | 2009-170137 A | 7/2009 |
| JP | 2010-113816 A | 5/2010 |
| WO | WO-2013035668 A1 * | 3/2013 ........ H01M 10/0431 |

* cited by examiner

*Primary Examiner* — Maria Laios
(74) *Attorney, Agent, or Firm* — Westerman, Hattori, Daniels & Adrian, LLP

(57) ABSTRACT

A rolled electrode assembly having a positive electrode plate and a negative electrode plate is housed in a prismatic outer body having as mouth together with non-aqueous electrolyte, and the mouth of the prismatic outer body is sealed by a sealing plate made of metal. The rolled electrode assembly is housed in the prismatic outer body, with the outer surface of the rolled electrode assembly covered by an insulating sheet except for the outer surface facing the sealing plate. The arithmetic mean roughness (Sa) of at least one surface of the insulating sheet disposed between the rolled electrode assembly and the prismatic outer body is 0.3 μm or more.

17 Claims, 5 Drawing Sheets

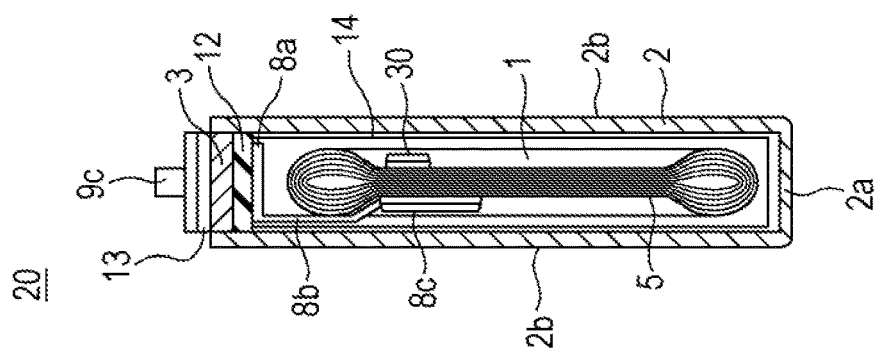
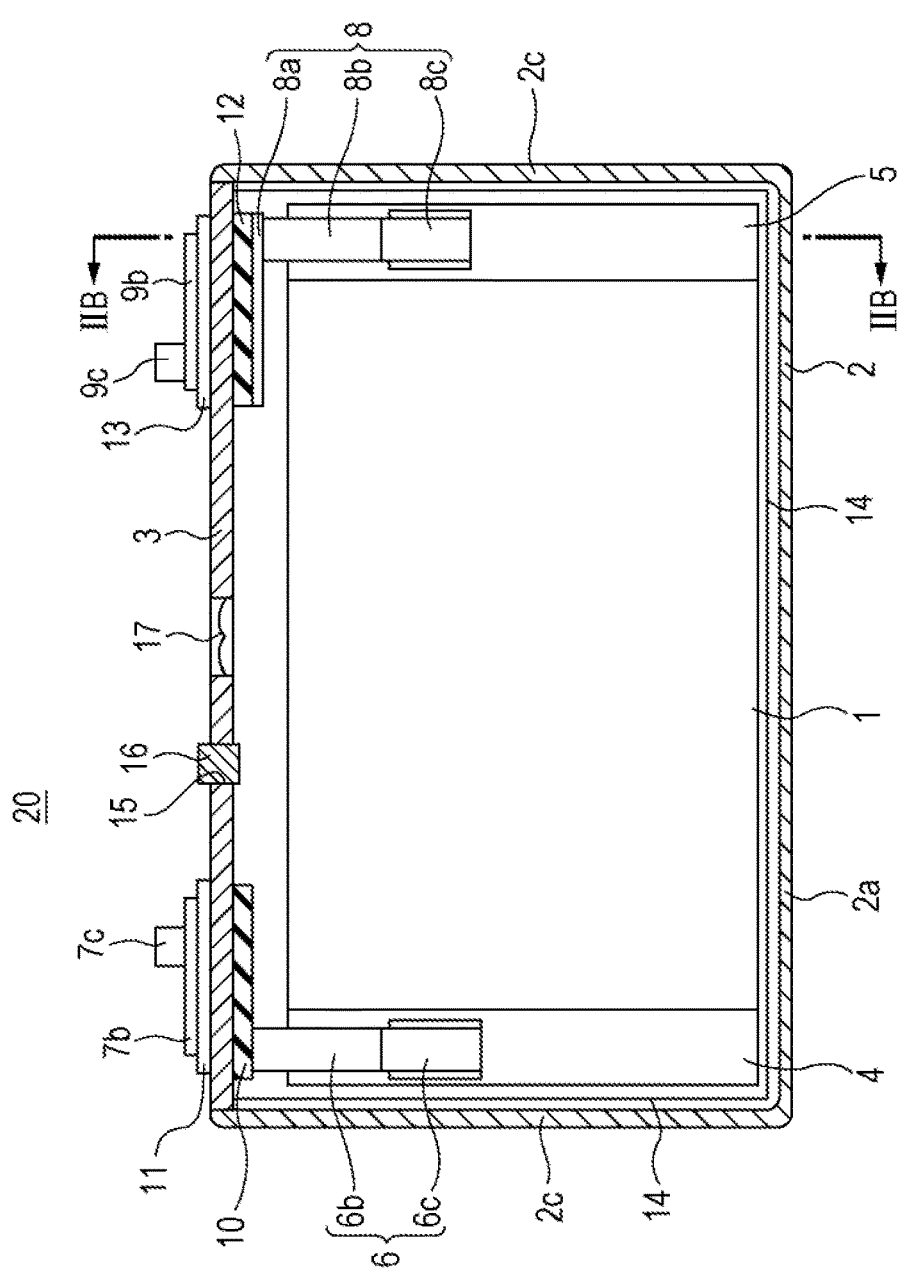

SECONDARY BATTERY

CROSS REFERENCE TO RELATED APPLICATIONS

The present invention application claims priority to Japanese Patent Application No. 2015-130520 filed in the Japan Patent Office on Jun. 30, 2015, the entire contents of which are incorporated herein by reference.

BACKGROUND OF THE INVENTION

Field of the Invention
The present invention relates to a secondary battery.
Description of Related Art
Non-aqueous electrolyte secondary batteries typified by lithium-ion secondary batteries are used in hybrid electric vehicles, electric vehicles, and large-scale electricity storage systems, and the like.

In such secondary batteries, an electrode assembly including a positive electrode plate and a negative electrode plate is housed together with electrolyte in an outer body made of metal and having a mouth, and the mouth of the outer body is sealed by a sealing plate made of metal. In order to prevent the outer body made of metal from directly touching the electrode assembly, the electrode assembly is housed in the outer body while being covered by an electrically insulating sheet.

For example, Japanese Published Unexamined Patent Application No. 2009-170137 (Patent Document 1) and Japanese Published Unexamined Patent Application No. 2009-048966 (Patent Document 2) disclose covering a flattened electrode assembly to be housed in an outer can with an insulating sheet shaped into a box-like or bag-like shape.

Usually, an insulating sheet covering an electrode assembly is flat and is shaped into a box-like or bag-like shape when used. Therefore, a process for shaping a flat insulating sheet into a box-like or bag-like shape is required. In such a process, unshaped flat insulating sheets are stacked, and, from this stack of insulating sheets, insulating sheets are fed one at a time into a shaping jig and shaped into a predetermined shape.

The inventor found that the foregoing shaping process has the following problem. In the stack of insulating sheets, static electricity tends to be generated, and static electricity tends to cause the insulating sheets to adhere to each other. When the insulating sheets are adhered to each other owing to static electricity, a multiple feed may occur when feeding the insulating sheets into the shaping jig. If a multiple feed occurs, this causes trouble and leads to low productivity.

BRIEF SUMMARY OF THE INVENTION

It is an object of the present invention to provide a secondary battery excellent in productivity.

In an aspect of the present invention, a secondary battery includes an electrode assembly having a positive electrode plate and a negative electrode plate, an outer body made of metal, having a mouth, and housing the electrode assembly, and a sealing plate made of metal and sealing the mouth. An insulating sheet is disposed between the outer body and the electrode assembly. The arithmetic mean roughness (Sa) of at least one surface of the insulating sheet is 0.3 µm or more.

According to the foregoing configuration, at least one surface of the insulating sheet is roughened. Thus, when insulating sheets are stacked, the insulating sheets can be prevented from adhering to each other owing to static electricity or the like. Therefore, a multiple feed of insulating sheets into a shaping jig can be prevented. Thus, the secondary battery having the foregoing configuration is excellent in productivity.

Possible methods for roughening the surface of an insulating sheet include a method in which the surface of an insulating sheet is pressed by a roller having a roughened surface, a roller having minute depressions and protrusions on the surface thereof, or the like. Alternatively, the surface of an insulating sheet may be roughened using chemicals or the like.

It is preferable that the outer body have an outer body bottom portion, a pair of large-area side walls, and a pair of small-area side walls and that the insulating sheet be disposed between the outer body bottom portion and the electrode assembly, between each of the pair of large-area side walls and the electrode assembly, and between each of the pair of small-area side walls and the electrode assembly.

It is preferable that the insulating sheet be shaped into a box-like or bag-like shape.

It is preferable that the arithmetic mean roughness (Sa) of a first surface of the insulating sheet be larger than the arithmetic mean roughness (Sa) of a second surface of the insulating sheet and that the first surface of the insulating sheet face the outer body and that the second surface of the insulating sheet face the electrode assembly.

It is preferable that the arithmetic mean roughness (Sa) of the first surface of the insulating sheet be 0.3 µm or more and that the coefficient of static friction of the first surface of the insulating sheet with respect to the second surface of the insulating sheet be 0.28 or less.

It is preferable that the arithmetic mean roughness (Sa) of the first surface of the insulating sheet be 0.5 µm or more.

BRIEF DESCRIPTION OF THE SEVERAL VIEWS OF THE DRAWINGS

FIG. 2A is a sectional view of the prismatic secondary battery according to the embodiment, and FIG. 2B is a sectional view taken along line IIB-IIB of FIG. 2A;

DETAILED DESCRIPTION OF THE INVENTION

The embodiment of the present invention will now be described in detail with reference to the drawings. The present invention is not limited to the following embodiment. First, the configuration of a prismatic secondary battery 20 according to the embodiment will be described with reference to FIGS. 1, 2A, and 2B.

Figure 1:
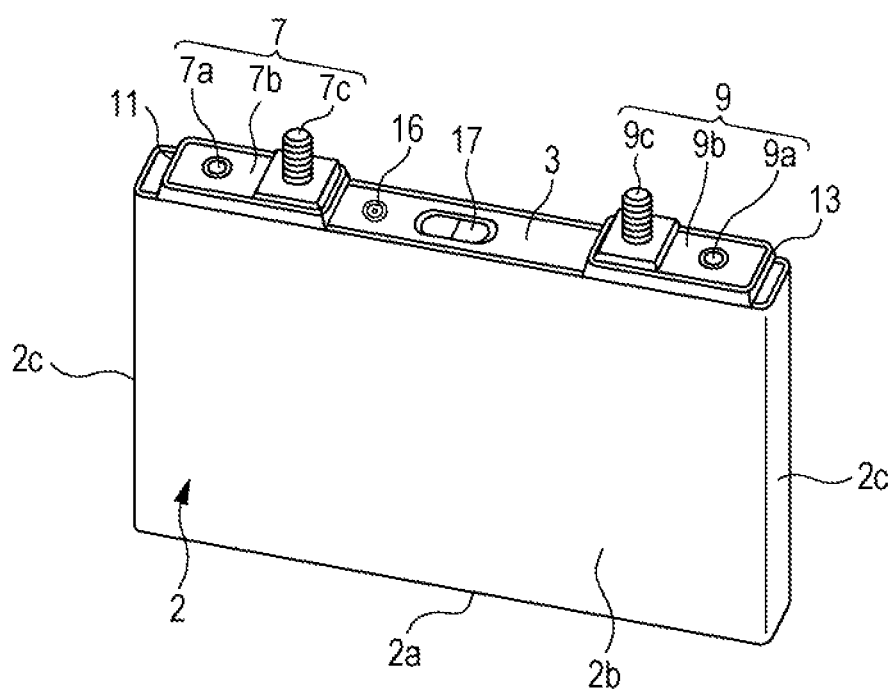
FIG. 1 is a perspective view of a prismatic secondary battery according to the embodiment.

As shown in FIGS. 1, 2A, and 2B, the prismatic secondary battery 20 has a prismatic outer body 2 having a mouth at the top thereof, and a sealing plate 3 sealing the mouth. A battery case is formed by the prismatic outer body 2 and the sealing plate 3. The prismatic outer body 2 and the sealing plate 3 are made of metal, and are preferably made of aluminum or aluminum alloy. A flattened rolled electrode assembly 1 in which a positive electrode plate (not shown) and a negative electrode plate (not shown) are rolled with a separator (not shown) interposed therebetween is housed in the prismatic outer body 2 together with electrolyte. A separator made of polyolefin is located on the outermost surface of the flattened rolled electrode assembly 1. In the positive electrode plate, a positive electrode active material mixture layer containing a positive electrode active material is formed on a positive electrode substrate made of metal, and a part where the positive electrode substrate is exposed is formed along the longitudinal direction. In the negative electrode plate, a negative electrode active material mixture layer containing a negative electrode active material is formed on a negative electrode substrate made of metal, and a part where the negative electrode substrate is exposed is formed along the longitudinal direction. The positive electrode substrate is preferably made of aluminum or aluminum alloy, and the negative electrode substrate is preferably made of copper or copper alloy.

The rolled electrode assembly 1 has, at one end in the rolling axis direction, a positive electrode substrate exposed portion 4 where the positive electrode mixture layer is not formed, and has, at the other end in the rolling axis direction, a negative electrode substrate exposed portion 5 where the negative electrode mixture layer is not formed. A positive electrode collector 6 is connected by welding to the positive electrode substrate exposed portion 4. A positive electrode terminal 7 is connected to the positive electrode collector 6. A negative electrode collector 8 is connected by welding to the negative electrode substrate exposed portion 5. A negative electrode terminal 9 is connected to the negative electrode collector 8.

The positive electrode terminal 7 has a connection terminal 7a inserted into a through-hole provided in the sealing plate 3, a connection plate 7b disposed on the outer side of the sealing plate 3, and a bolt portion 7c connected to the connection plate 7b. The negative electrode terminal 9 has a connection terminal 9a inserted into a through-hole provided in the sealing plate 3, a connection plate 9b disposed on the outer side of the sealing plate 3, and a bolt portion 9c connected to the connection plate 9b. The connection terminals 7a and 9a each have a flange portion disposed on the outer side of the sealing plate 3, a protruding portion formed on the outer side of the flange portion, and an insertion portion disposed on the inner side of the flange portion and inserted into a through-hole provided in the sealing plate 3. The connection plate 7b and the connection plate 9b are respectively connected to the protruding portion of the connection terminal 7a and the protruding portion of the connection terminal 9a.

A positive electrode collector receiving part is disposed on a side of the positive electrode substrate exposed portion 4 that is opposite to the side on which the positive electrode collector 6 is disposed. A negative electrode collector receiving part 30 is disposed on a side of the negative electrode substrate exposed portion 5 that is opposite to the side on which the negative electrode collector 8 is disposed.

The positive electrode collector 6 has a terminal connection portion connected to the positive electrode terminal 7, a lead portion 6b extending from the terminal connection portion toward the rolled electrode assembly 1, and a connection portion 6c provided at the distal end of the lead portion 6b and connected to the positive electrode substrate exposed portion 4. The positive electrode collector 6 is preferably made of aluminum or aluminum alloy. The thickness of the positive electrode collector 6 is preferably about 0.5 to 2 mm.

The negative electrode collector 8 has a terminal connection portion 8a connected to the negative electrode terminal 9, a lead portion 8b extending from the terminal connection portion 8a toward the rolled electrode assembly 1, and a connection portion 8c provided at the distal end of the lead portion 8b and connected to the negative electrode substrate exposed portion 5. The negative electrode collector 8 is preferably made of copper or copper alloy. The thickness of the negative electrode collector 8 is preferably about 0.5 to 2 mm.

The positive electrode terminal 7 is fixed to the sealing plate 3 with an outer insulating member 11 interposed therebetween. The positive electrode collector 6 is fixed to the sealing plate 3 with an inner insulating member 10 interposed therebetween. The negative electrode terminal 9 is fixed to the sealing plate 3 with an outer insulating member 13 interposed therebetween. The negative electrode collector 8 is fixed to the sealing plate 3 with an inner insulating member 12 interposed therebetween. The inner insulating member 10 is disposed between the sealing plate 3 and the positive electrode collector 6. The inner insulating member 12 is disposed between the sealing plate 3 and the negative electrode collector 8. The outer insulating member 11 is disposed between the sealing plate 3 and the positive electrode terminal 7. The outer insulating member 13 is disposed between the sealing plate 3 and the negative electrode terminal 9.

The rolled electrode assembly 1 is housed in the prismatic outer body 2 while being covered by an insulating sheet 14. The prismatic outer body 2 has an outer body bottom portion 2a, a pair of large-area side walls 2b, and a pair of small-area side walls 2c. The insulating sheet 14 is disposed between the outer body bottom portion 2a and the rolled electrode assembly 1, between each of the pair of large-area side walls 2b and the rolled electrode assembly 1, and between each of the pair of small-area side walls 2c and the rolled electrode assembly 1. The sealing plate 3 is connected to the edge of the mouth of the prismatic outer body 2 by laser welding or the like. The sealing plate 3 has an electrolyte pour hole 15, and the electrolyte pour hole 15 is sealed by a sealing plug 16 after the pouring of electrolyte. A gas release valve 17 for releasing gas when the pressure in the battery reaches or exceeds a predetermined value is formed in the sealing plate 3. A current breaking mechanism that operates to break the conductive path when the pressure in the battery reaches or exceeds a predetermined value may be provided in the conductive path between the positive electrode plate and the positive electrode terminal 7 or the conductive path between the negative electrode plate and the negative electrode terminal 9. When providing the current breaking mechanism, the working pressure of the current breaking mechanism is set lower than the working pressure of the gas release valve 17.

Making of Rolled Electrode Assembly

Next, a method for making the rolled electrode assembly 1 will be described.

A positive electrode active material mixture containing lithium cobalt oxide ($LiCoO_2$) as a positive electrode active material, conductive agent, and binder is applied to both sides of a rectangular aluminum foil having a thickness of 15 μm and serving as a positive electrode substrate to form positive electrode active material mixture layers. Thus, a positive electrode plate is made that has, at one end in the short side direction, a positive electrode substrate exposed portion having a predetermined width to which the positive electrode active material mixture is not applied. A negative electrode active material mixture containing natural graphite powder as a negative electrode active material and binder is applied to both sides of a rectangular copper foil having a thickness of 8 μm and serving as a negative electrode substrate to form negative electrode active material mixture layers. Thus, a negative electrode plate is made that has, at one end in the short side direction, a negative electrode substrate exposed portion having a predetermined width to which the negative electrode active material mixture is not applied.

The positive electrode plate and negative electrode plate obtained in the foregoing manner are shifted from each other so that the positive electrode substrate exposed portion and the negative electrode substrate exposed portion do not overlap with the active material mixture layers of their opposing electrodes, and are rolled with a separator having a three-layer (polypropylene/polyethylene/polypropylene) structure interposed therebetween. After that, the rolled electrode assembly is shaped into a flattened shape. Thus, a flattened rolled electrode assembly 1 is made at one end of which a positive electrode substrate exposed portion 4 in which a plurality of positive electrode substrates are laminated is formed, and at the other end of which a negative electrode substrate exposed portion 5 in which a plurality of negative electrode substrates are laminated is formed.

Assembly of Sealing Plate

Next, a method for attaching the negative electrode collector 8 and the negative electrode terminal 9 to the sealing plate 3 will be described. The positive electrode collector 6 and the positive electrode terminal 7 can be attached to the sealing plate 3 in the same manner as the negative electrode collector 8 and the negative electrode terminal 9.

The outer insulating member 13 is disposed on the outer side of the sealing plate 3, and the inner insulating member 12 and the terminal connection portion 8a of the negative electrode collector 8 are disposed on the inner side of the sealing plate 3. The insertion portion of the connection terminal 9a is inserted from the outer side of the battery into through-holes provided in the outer insulating member 13, the sealing plate 3, the inner insulating member 12, and the terminal connection portion 8a, and the distal end of the insertion portion of the connection terminal 9a is crimped on the terminal connection portion 8a. Thus, the negative electrode terminal 9, the outer insulating member 13, the sealing plate 3, the inner insulating member 12, and the terminal connection portion 8a are integrally fixed.

Attachment of Collector to Electrode Assembly

Next, a method for attaching the negative electrode collector 8 to the rolled electrode assembly 1 will be described. The positive electrode collector 6 can be attached to the rolled electrode assembly 1 in the same manner as the negative electrode collector 8.

The connection portion 8c of the negative electrode collector 8 is disposed on the outermost surface of the rolled negative electrode substrate exposed portion 5. The negative electrode collector receiving part 30 is disposed on a side of the rolled negative electrode substrate exposed portion 5 that is opposite to the side on which the connection portion 8c is disposed. One of the resistance welding electrodes is abutted to the outer surface of the connection portion 8c, and the other resistance welding electrode is abutted to the outer surface of the negative electrode collector receiving part 30. In a state where the connection portion 8c, the negative electrode substrate exposed portion 5, and the negative electrode collector receiving part 30 are interposed between the pair of resistance welding electrodes, resistance welding current is applied to resistance weld the connection portion 8c, the negative electrode substrate exposed portion 5, and the negative electrode collector receiving part 30. The negative electrode collector receiving part 30 is not essential and may be omitted.

Insulating Sheet

Next, the configuration of the insulating sheet 14, and the process for covering the rolled electrode assembly 1 with the insulating sheet 14 will be described.

Figure 3:
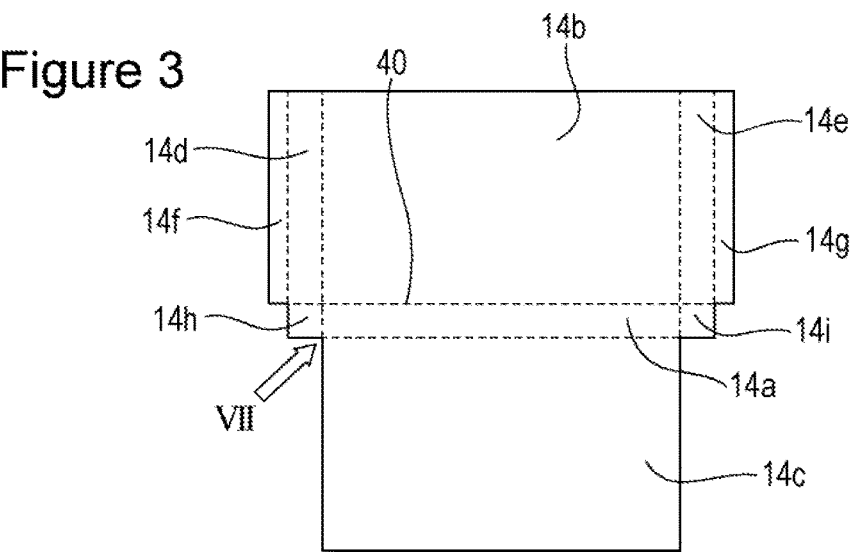
FIG. 3 is a development view of the insulating sheet used in the prismatic secondary battery according to the embodiment.

FIG. 3 is a development view of the insulating sheet 14. The insulating sheet 14 has a bottom portion 14a disposed between the rolled electrode assembly 1 and the outer body bottom portion 2a of the prismatic outer body 2, a first side wall portion 14b disposed between the rolled electrode assembly 1 and one of the large-area side walls 2b of the prismatic outer body 2, a second side wall portion 14c disposed between the rolled electrode assembly 1 and the other of the large-area side walls 2b of the prismatic outer body 2, a third side wall portion 14d disposed between the rolled electrode assembly 1 and one of the small-area side walls 2c of the prismatic outer body 2, and a fourth side wall portion 14e disposed between the rolled electrode assembly 1 and the other of the small-area side walls 2c of the prismatic outer body 2.

The insulating sheet 14 further has overlapping portions 14f and 14g formed at the end of the third side wall portion 14d and at the end of the fourth side wall portion 14e. In a shaped state, the overlapping portions 14f and 14g are disposed so as to overlap the second side wall portion 14c. The insulating sheet 14 has tongue portions 14h and 14i at both ends of the bottom portion 14a. In order to facilitate the folding of the insulating sheet 14, perforation-like cuts 40 are provided on the boundaries between the respective portions.

Figure 4:
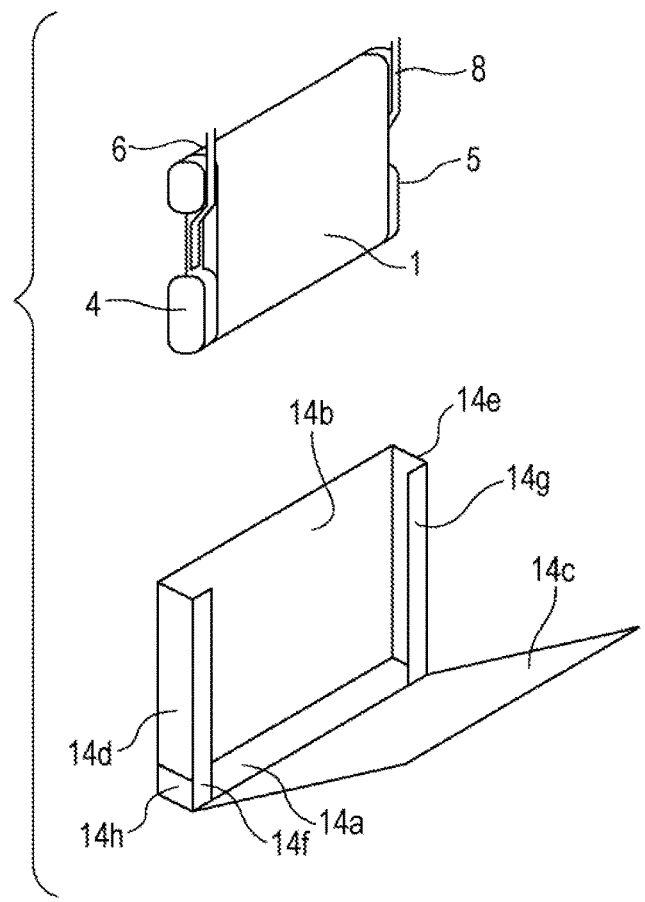
FIG. 4 is a diagram showing the process for inserting a rolled electrode assembly into the folded insulating sheet.

FIG. 4 is a diagram showing the process for inserting the rolled electrode assembly 1 into the insulating sheet 14 folded into a box-like shape. After the insertion, the overlapping portions 14f and 14g are disposed so as to overlap the second side wall portion 14c, and are heat-welded to the second side wall portion 14c. The tongue portions 14h and 14i are disposed on the outer sides of the third side wall portion 14d and the fourth side wall portion 14e, respectively.

The insulating sheet 14 is preferably made of resin. The insulating sheet 14 is preferably made of polypropylene, polyethylene, polyester, polyethylene naphthalate, or the like, and particularly preferably made of polypropylene.

The thickness of the insulating sheet 14 is preferably 0.05 to 0.3 mm, and more preferably 0.1 to 0.2 mm. The insulating sheet 14 is preferably not porous.

Figure 5:
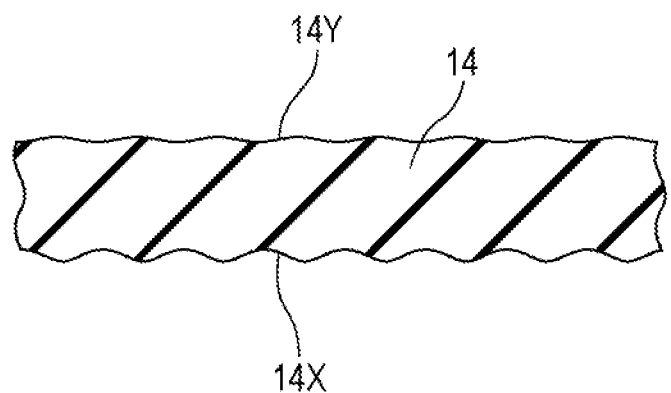
FIG. 5 is an enlarged sectional view along the thickness direction of the insulating sheet.

FIG. 5 is an enlarged sectional view along the thickness direction of the insulating sheet 14. The insulating sheet 14 has a first surface 14X and a second surface 14Y opposite thereto. The first and second surfaces 14X and 14Y are each embossed and roughened. Therefore, when feeding an insulating sheet 14 from a stack of unshaped insulating sheets 14 into a shaping jig, a multiple feed due to adhesion between insulating sheets 14 caused by static electricity can be prevented.

It is preferable that the arithmetic mean roughness (Sa) of the first surface 14X be different from the arithmetic mean roughness (Sa) of the second surface 14Y. In the insulating sheet 14, the arithmetic mean roughness (Sa) of the first surface 14X is larger than the arithmetic mean roughness (Sa) of the second surface 14Y.

Figure 6:
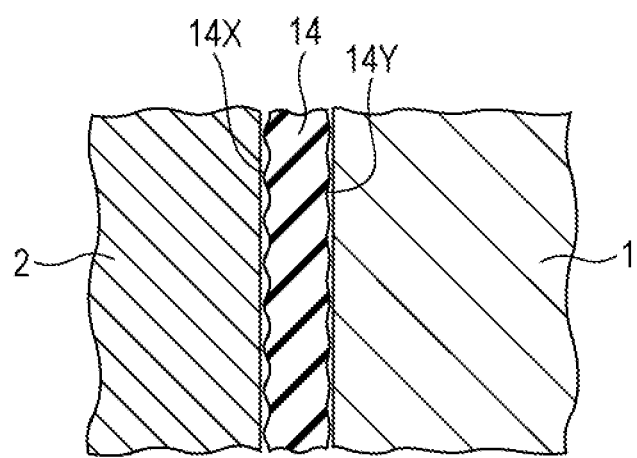
FIG. 6 is an enlarged sectional view of the vicinity of the insulating sheet of the prismatic secondary battery according to the embodiment.

FIG. 6 is an enlarged sectional view of the vicinity of the insulating sheet 14 of the prismatic secondary battery 20. As shown in FIG. 6, the first surface 14X of the insulating sheet 14 is disposed so as to face the prismatic outer body 2, and the second surface 14Y of the insulating sheet 14 is disposed so as to face the rolled electrode assembly 1. The arithmetic mean roughness (Sa) of the first surface 14X of the insulating sheet 14 is larger than the arithmetic mean roughness (Sa) of the second surface 14Y of the insulating sheet 14. Since the second surface 14Y, which has a small arithmetic mean roughness (Sa), faces the rolled electrode assembly 1, the frictional resistance between the insulating sheet 14 and the rolled electrode assembly 1 is large, and the insulating sheet 14 can be prevented from being displaced relative to the rolled electrode assembly 1. Since the first surface 14X, which has a large arithmetic mean roughness (Sa), faces the prismatic outer body 2, the frictional resistance between the insulating sheet 14 and the prismatic outer body 2 is small, and the rolled electrode assembly 1 covered by the insulating sheet 14 can be smoothly inserted into the prismatic outer body 2. A surface of the rolled electrode assembly 1 that faces the insulating sheet 14 is preferably a separator made of polyolefin.

A prismatic secondary battery was made in the foregoing manner using an insulating sheet 14 having a first surface 14X having an arithmetic mean roughness (Sa) of 0.80 μm and a second surface 14Y having an arithmetic mean roughness (Sa) of 0.15 μm. It was confirmed that adhesion between insulating sheets can be prevented compared to a case where an insulating sheet is used both surfaces of which have an arithmetic mean roughness (Sa) of 0.15 μm. It was also confirmed that when the first surface 14X, which has a larger arithmetic mean roughness (Sa), faces the prismatic outer body 2, and the second surface 14Y, which has a smaller arithmetic mean roughness (Sa), faces the rolled electrode assembly 1, the insulating sheet 14 is more unlikely to be displaced relative to the rolled electrode assembly 1, and the rolled electrode assembly 1 covered by the insulating sheet 14 can be more smoothly inserted into the prismatic outer body 2.

The arithmetic mean roughness (Sa) of the insulating sheet was measured using a 3D laser microscope (LEXT (OLS40-SU)) produced by Olympus Corporation.

The arithmetic mean roughness (Sa) of the first surface 14X is preferably 0.3 μm or more, more preferably 0.5 μm or more, and even more preferably 0.70 μm or more. The arithmetic mean roughness (Sa) of the first surface 14X is preferably 5 μm or less, more preferably 2 μm or less, and even more preferably 1.5 μm or less. The arithmetic mean roughness (Sa) of the second surface 14Y is preferably 0.05 μm or more, and more preferably 0.1 μm or more. The arithmetic mean roughness (Sa) of the second surface 14Y is preferably 2 μm or less, more preferably 1 μm or less, and even more preferably 0.5 μm or less.

It is preferable that protrusions be continuously formed on the surfaces of the insulating sheet. It is more effective to continuously form protrusions on the surfaces of the insulating sheet than to form protrusions with flat parts interposed therebetween, at intervals, on the surfaces of the insulating sheet.

The coefficient of static friction of the first surface 14X with respect to the second surface 14Y is preferably less than 0.3, more preferably 0.28 or less, and even more preferably 0.25 or less. The coefficient of static friction is obtained by measuring according to JIS K7125, and "the coefficient of static friction of the first surface 14X with respect to the second surface 14Y" is measured with the first surface 14X in contact with the second surface 14Y. Thus, the adhesion between insulating sheets 14 can be more reliably prevented.

Assembly of Secondary Battery

The rolled electrode assembly 1 disposed in the insulating sheet 14 folded into a box-like shape is inserted into the prismatic outer body 2. The joint between the sealing plate 3 and the prismatic outer body 2 is welded by laser welding to seal the mouth of the prismatic outer body 2. After that, non-aqueous electrolyte containing non-aqueous solvent and electrolytic salt is poured through the electrolyte pour hole 15 provided in the sealing plate 3, and the electrolyte pour hole 15 is sealed by the sealing plug 16 to make a prismatic secondary battery 20.

Other Inventions

Figure 7:
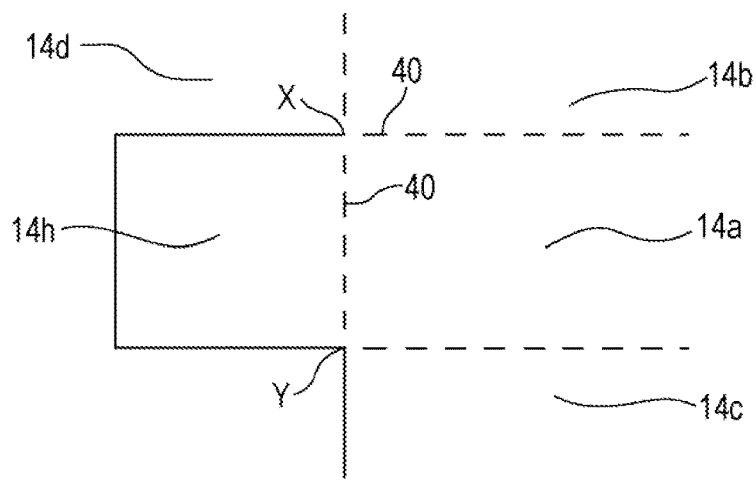
FIG. 7 is an enlarged view of part VII of FIG. 3.
Figure 8:
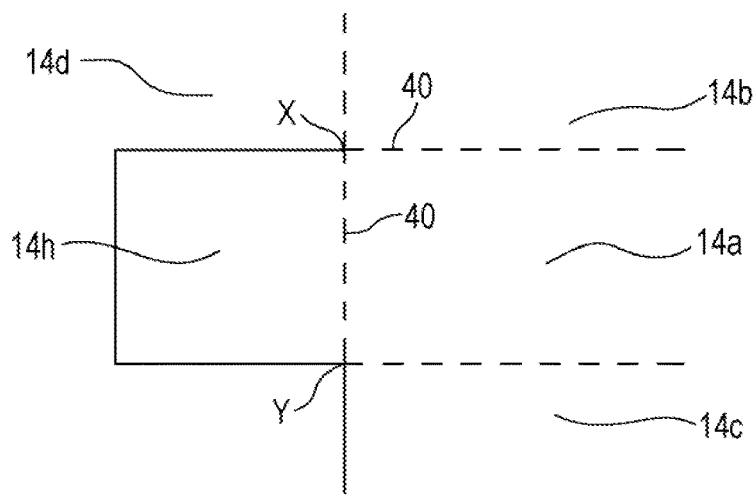
FIG. 8 is a diagram corresponding to FIG. 7 of an insulating sheet of a prismatic secondary battery according to a modification.

FIG. 7 is an enlarged view of part VII of FIG. 3. FIG. 8 is a diagram corresponding to FIG. 7 of an insulating sheet 14 of a prismatic secondary battery according to a modification. As shown in FIG. 7 and FIG. 8, perforation-like cuts 40 are provided between the bottom portion 14a and the first side wall portion 14b, and between the bottom portion 14a and the second side wall portion 14c.

The insulating sheet 14 described in FIG. 7 and the insulating sheet described in FIG. 8 differ in the position where perforation-like cuts 40 are formed. In the insulating sheet 14 shown in FIG. 8, cuts 40 are provided so as to be continuous with the end X of the boundary between the bottom portion 14a and the first side wall portion 14b, and the end Y of the boundary between the bottom portion 14a and the second side wall portion 14c. That is, the bottom portion 14a and the first side wall portion 14b are cut off from each other at the end X, and the bottom portion 14a and the second side wall portion 14c are cut off from each other at the end Y. In such a configuration, the corners of the bottom portion 14a of the insulating sheet 14 may curl outward (into FIG. 8). When inserting the rolled electrode assembly 1 covered by the insulating sheet 14 into the prismatic outer body 2, the outwardly curled corners of the bottom portion 14a may touch and damage the vicinity of the mouth of the prismatic outer body 2. If the vicinity of the mouth of the prismatic outer body 2 is damaged, blow holes or the like may be formed during the welding of the sealing plate 3, and the welding quality may be deteriorated.

In order to reliably prevent such a problem from occurring, it is preferable that, as shown in FIG. 7, cuts 40 be not continuous with the end X of the boundary between the bottom portion 14a and the first side wall portion 14b, and the end Y of the boundary between the bottom portion 14a and the second side wall portion 14c. That is, it is preferable that the bottom portion 14a and the first side wall portion 14b be continuous with each other at the end X, and the bottom portion 14a and the second side wall portion 14c be continuous with each other at the end Y. Such a configuration is also effective when the surfaces of the insulating sheet 14 are not roughened.

Since tongue portions 14h and 14i are formed adjacent to the bottom portion 14a of the insulating sheet 14, the corners of the bottom portion 14a can be more effectively prevented from curling. In addition, it is preferable that, as shown in FIG. 7, perforation-like cuts 40 be provided such that the tongue portion 14h and the bottom portion 14a are continuous with each other at the end X and the end Y.

As described above, when a line including the longitudinal end edge of the bottom portion 14a and the longitudinal end edge of the first side wall portion 14b (a line extending in the vertical direction in FIG. 7) is referred to as line L1, and a boundary line between the bottom portion 14a and the first side wall portion 14b (a line extending in the horizontal direction in FIG. 7) is referred to as line L2, it is preferable that the bottom portion 14a and the first side wall portion 14b be continuous with each other at the intersection (X) of line L1 and line L2. The same goes for the bottom portion 14a and the second side wall portion 14c.

When at least one of the four corners of the bottom portion 14a of the insulating sheet 14 has the foregoing configuration, an advantageous effect can be obtained. However, it is preferable that all of the four corners of the bottom portion 14a of the insulating sheet 14 have the foregoing configuration.

Figure 9:
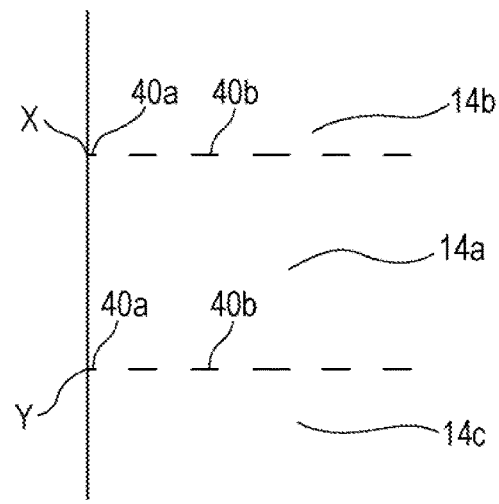
FIG. 9 is a diagram corresponding to FIG. 7 of an insulating sheet of a prismatic secondary battery according to another modification.

When cuts are formed so as to be continuous with the end X and the end Y as shown in FIG. 9, the bottom portion 14a can be prevented from curling when the width of the cuts 40a is smaller than the width of the cuts 40b in the middle part.

Others

Although, in the foregoing embodiment, the insulating sheet 14 is a resin sheet and is folded into a box-like shape when used, the insulating sheet 14 may have any other configuration. For example, the insulating sheet may be shaped into a bag-like shape. Alternatively, a plurality of insulating sheets may be used.

Although, in the foregoing embodiment, a rolled electrode assembly is used, a laminated electrode assembly may be used.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
an electrode assembly having a positive electrode plate and a negative electrode plate;
an outer body made of metal, having a mouth, and housing the electrode assembly;
an insulating sheet disposed between the electrode assembly and the outer body, and having a first surface facing the outer body and a second surface facing the electrode assembly; and
a sealing plate made of metal and sealing the mouth,
wherein the arithmetic mean roughness (Sa) of the first surface is 0.3 μm or more and is larger than the arithmetic mean roughness (Sa) of the second surface, and wherein the coefficient of static friction of the first surface with respect to the second surface is 0.28 or less.

2. The secondary battery according to claim 1, wherein the outer body has an outer body bottom portion, a pair of large-area side walls, and a pair of small-area side walls, and wherein the insulating sheet is disposed between the outer body bottom portion and the electrode assembly, between each of the pair of large-area side walls and the electrode assembly, and between each of the pair of small-area side walls and the electrode assembly.

3. The secondary battery according to claim 1, wherein the insulating sheet is shaped into a box shape or bag shape.

4. The secondary battery according to claim 1, wherein the arithmetic mean roughness (Sa) of the first surface is 0.5 μm or more.

5. The secondary battery according to claim 1, wherein the arithmetic mean roughness (Sa) of the first surface is 5 μm or less.

6. A secondary battery comprising:
an electrode assembly having a positive electrode plate, a negative electrode plate and a separator interposed between the positive electrode plate and the negative electrode plate, the electrode assembly being rolled and the separator being located on the outermost surface of the electrode assembly;
an outer body made of metal, having a mouth, and housing the electrode assembly;
an insulating sheet disposed between the electrode assembly and the outer body and contacting the separator; and
a sealing plate made of metal and sealing the mouth,
wherein the arithmetic mean roughness (Sa) of at least one surface of the insulating sheet is 0.3 μm or more, and
wherein the insulating sheet is nonporous.

7. The secondary battery according to claim 6, wherein the insulating sheet has a first surface facing the outer body and a second surface facing the electrode assembly, and wherein the arithmetic mean roughness (Sa) of the first surface is larger than the arithmetic mean roughness (Sa) of the second surface.

8. The secondary battery according to claim 6, wherein the separator is located between the negative electrode plate and the insulating sheet.

9. The secondary battery according to claim 6, wherein the insulating sheet has portions having perforation cuts such that the insulating sheet forms a cuboid shape by the portions being folded at the perforation cuts.

10. The secondary battery according to claim 7, wherein the arithmetic mean roughness (Sa) of the first surface is 5 μm or less, and wherein the arithmetic mean roughness (Sa) of the second surface 2 μm or less.

11. The secondary battery according to claim 9, wherein the insulating sheet comprises a first side wall portion and a bottom portion having a first side and a second side which is longer than the first side and along which perforation cuts are provided, wherein the bottom portion is connected to the first side wall at the intersection of the first side and the second side.

12. A secondary battery comprising:
an electrode assembly having a positive electrode plate, a negative electrode plate and a separator interposed between the positive electrode plate and the negative electrode plate;
an outer body made of metal, housing the electrode assembly, and having a mouth, an outer body bottom portion, a pair of large-area side walls, and a pair of small-area side walls;
an insulating sheet disposed between the outer body bottom portion and the electrode assembly, between each of the pair of large-area side walls and the electrode assembly, and between each of the pair of small-area side walls and the electrode assembly, the insulating sheet contacting the separator; and
a sealing plate made of metal and sealing the mouth, wherein the arithmetic mean roughness (Sa) of at least one surface of the insulating sheet is 0.3 μm or more, and wherein the insulating sheet is nonporous.

13. The secondary battery according to claim 12, wherein the insulating sheet has a first surface facing the outer body and a second surface facing the electrode assembly, and wherein the arithmetic mean roughness (Sa) of the first surface is larger than the arithmetic mean roughness (Sa) of the second surface.

14. The secondary battery according to claim 12, wherein the separator is rolled with the positive electrode plate and the negative electrode plate, and located on the outermost surface of the electrode assembly.

15. The secondary battery according to claim 12, wherein the separator is located between the negative electrode plate and the insulating sheet.

16. The secondary battery according to claim 12, wherein the insulating sheet has portions having perforation cuts such that the insulating sheet forms a cuboid shape by the portions being folded at the perforation cuts.

17. The secondary battery according to claim 12, wherein the arithmetic mean roughness (Sa) of the first surface is 5 μm or less, and wherein the arithmetic mean roughness (Sa) of the second surface 2 μm or less.

* * * * *